(12) United States Patent
Leicht

(10) Patent No.: US 6,230,962 B1
(45) Date of Patent: May 15, 2001

(54) PROCESS FOR COOLING SOLDERED OBJECTS

(76) Inventor: Helmut W. Leicht, Messerschmittring 61-63, D-86343 Königsbrunn bei, Augsburg (DE)

( * ) Notice: Subject to any disclaimer, the term of this patent is extended or adjusted under 35 U.S.C. 154(b) by 0 days.

(21) Appl. No.: 09/171,402

(22) PCT Filed: Apr. 10, 1997

(86) PCT No.: PCT/EP97/01796
§ 371 Date: Mar. 11, 1999
§ 102(e) Date: Mar. 11, 1999

(87) PCT Pub. No.: WO97/40424
PCT Pub. Date: Oct. 30, 1997

(30) Foreign Application Priority Data

Apr. 18, 1996 (DE) .............................. 196 15 338

(51) Int. Cl.$^7$ .......................... B23K 31/02; B23K 35/38; B23K 1/00; B23K 5/22; B23K 28/00
(52) U.S. Cl. ............................ 228/222; 228/46; 228/200; 228/234.2
(58) Field of Search ................. 228/222, 46, 234.2, 228/200

(56) References Cited

U.S. PATENT DOCUMENTS

| | | | |
|---|---|---|---|
| 4,348,174 | * | 9/1982 | Spigarelli ................................ 432/1 |
| 4,389,797 | * | 6/1983 | Spigarelli et al. ........................ 34/73 |
| 4,771,929 | * | 9/1988 | Bahr et al. ............................ 228/102 |
| 4,840,305 | * | 6/1989 | Ankrom et al. ....................... 228/232 |
| 5,333,774 | * | 8/1994 | Mishina et al. ......................... 228/46 |
| 5,514,414 | * | 5/1996 | Gao et al. .......................... 427/255.6 |

FOREIGN PATENT DOCUMENTS

| | | | |
|---|---|---|---|
| 3840098 C1 | 12/1989 | (DE) | ................................ B23K/1/00 |
| 92 18 177 U | 11/1993 | (DE) | .............................. B23K/1/015 |
| 0 138 707-A1 | 10/1983 | (EP) | ................................ F28D/15/00 |

OTHER PUBLICATIONS

Patent Abstracts of Japan, vol. 13, No. 365 (M–859) [3713], Aug. 15, 1989.
Japanese Abstract No. JP 01 122663 A (Mitsubishi Denki K.K.).

* cited by examiner

Primary Examiner—Patrick Ryan
Assistant Examiner—Zidia T. Pittman
(74) Attorney, Agent, or Firm—Ohlandt, Greeley, Ruggiero & Perle LLP; George W. Rauchfuss, Jr.

(57) ABSTRACT

A process for cooling soldered objects, according to which a liquid is applied onto the soldered object and is evaporated in an accelerated manner. According to a preferred embodiment the soldered object is cooled in a vapor phase soldering apparatus directly after removal from the vapor phase using the vapor phase soldering liquid. The advantages of the process consist in a greatly increased cooling rate of the soldered object and in an improved quality of the soldered joints.

13 Claims, 1 Drawing Sheet

PROCESS FOR COOLING SOLDERED OBJECTS

Figure 1:
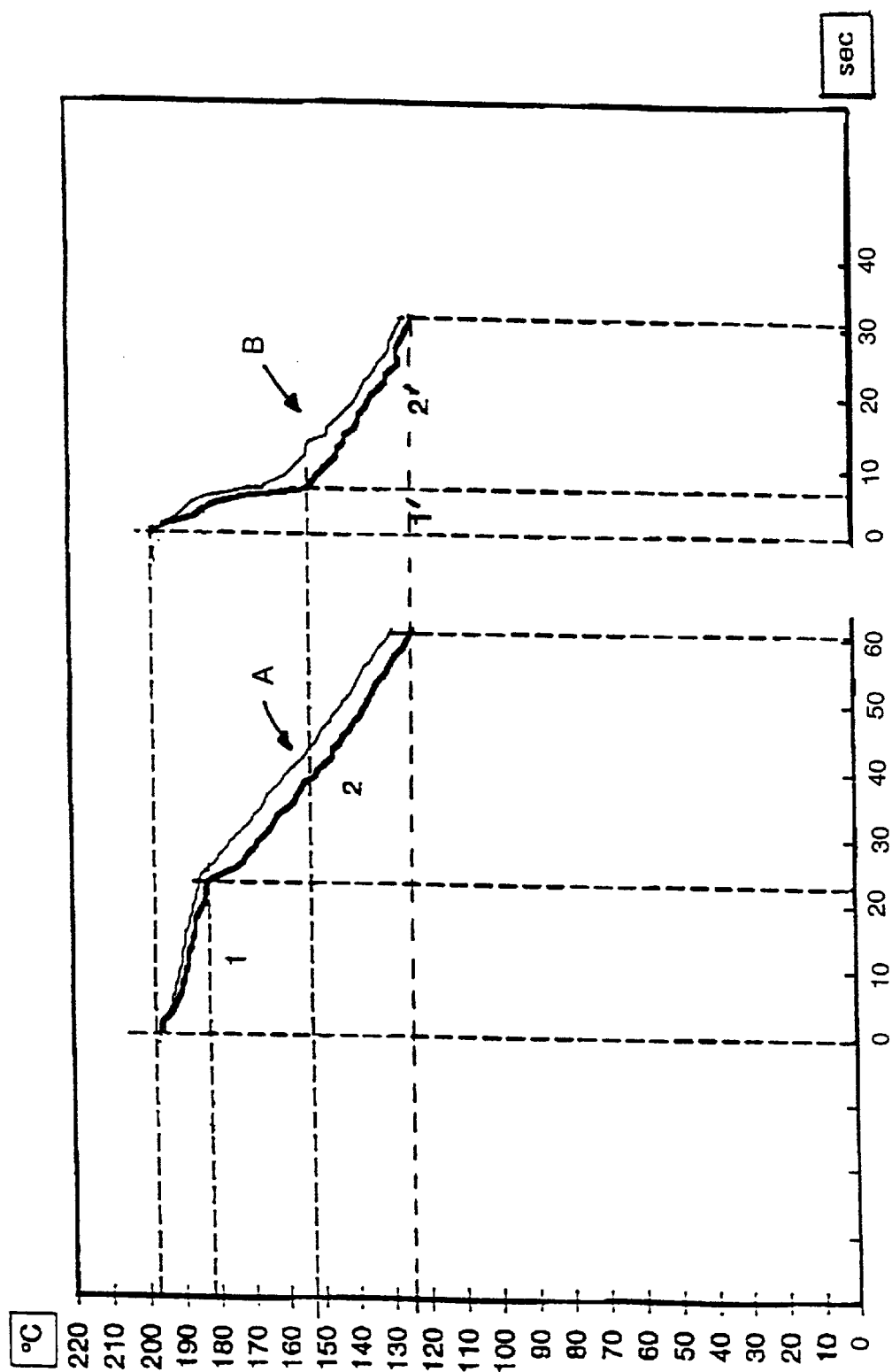

This invention relates to a process for cooling soldered objects, in particular in vapour phase soldering.

When modules or module units are to be soldered it is decisive that the object to be soldered be heated so well that no cold soldered joints will occur. This requires thorough heating of the soldering partners. In many cases it is extremely important that the soldered object is cooled rapidly subsequent to soldering. While it is relatively unproblematical in many soldering processes to conduct e. g. cooling air to the soldered object, this is not the case in the vapour phase soldering process. In vapour soldering it is of great importance that the climate conditions of the processing chamber are kept stable. It is therefore impossible to start cooling of the soldered object immediately after soldering. Moreover, entrainment of the soldering medium in the form of vapour molecules is to be avoided, because the vapour phase soldering liquids are very expensive. After the soldered object has been removed from the vapour layer it dries and cools relatively slowly by way of natural convection. According to the prior art, cooling of the soldered object normally takes place far away from the vapour zone. As a rule, the cooling zone is furthermore locked by lockages which prevent that too many molecules from the vapour phase are entrained.

Cooling of the soldered objects can also be effected by spraying a cold liquid onto them. Such cooling is disclosed in DE-39 15 040.

EP-A-0 138 707 (which corresponds to U.S. Pat. No. 4,612,712) discloses a vapour phase heating apparatus. DE-C-38 40 098 discloses an apparatus for removing soldering residues by means of a drying step using a blower.

It is known that rapid cooling of the soldered joint after soldering is advantageous with respect of the metal structure of the soldered joints. As long as the solder is in the liquid stage, alloying of the participating metals takes place. In general, this leads to drawbacks with respect to the metallurgy of the soldered joints and should be avoided, if possible. Rapid cooling of the soldered objects after soldering is thus decisive. One can proceed from the assumption that the shorter the liquid phase of the solder the better the quality of the soldered joint. It is known from various studies that very rapid cooling of the soldered joint can yield higher strength. In this process the soldered joints were cooled almost in a shock-like manner. This type of cooling, though it would be desirable with respect to the quality criteria to be achieved, is accomplished in none of the soldering processes used in modern mass production.

It is the object of this invention to provide a process for cooling soldered objects, according to which rapid cooling of the soldered objects is achieved directly after soldering.

It is a further object of this invention to cool parts of the soldered objects outside the soldered joints.

These objects are achieved by means of the features of the claims.

To achieve these objects the invention proceeds from the basic idea to apply a liquid onto the soldered objects and to subject them to accelerated evaporation. Evaporation heat is thus withdrawn from the soldered objects and they are thus cooled rapidly.

According to an advantageous embodiment, the process is used in vapour phase soldering. The invention utilizes the special climatic conditions prevailing above the vapour phase. Directly above the vapour phase the temperature decreases from e.g. 200° C. (boiling point of the vapour phase liquid) to about 50° C. within a few centimeters of height. Moreover, vapour phase molecules and e.g. ambient air are in the region above the vapour phase. The invention proceeds from the basic idea that the humidity of the atmosphere above the vapour phase which is substantially determined by the vapour molecules, is forced e.g. by means of a blower to condensation onto the soldered object. By means of the condensation of the liquid in connection with forced convection caused by the blower and the resulting cold due to evaporation it is possible to achieve rapid cooling of the soldered objects directly after removal from the vapour phase, i. e. within a few seconds.

The invention is further illustrated by means of the single drawing. 1 shows:

A temperature/time diagram of the cooling process of the invention in comparison with a cooling process of the prior art.

The Curves A show the conventional cooling after removal from the vapour phase. The thick line shows the temperature of the soldered joint and the thin line the temperature at the lower edge of the soldered object. Section 1 shows the cooling by natural convection. This is followed by Section 2, in which cooling is effected by means of dry forced convection without deposition of a liquid, which leads to a more rapid cooling.

Curves B show the cooling according to the process of the invention. As in Curves A the thick line represents the temperature of the soldered joint and the thin line the temperature of the lower edge of the soldered object. In Section 1' cooling is effected by means of wet forced convection. This means, when the process of the invention is applied in a vapour phase soldering apparatus, that liquid from the vapour phase has been deposited onto the soldered object, e.g. by means of a blower, and has been evaporated in an accelerated manner under the influence of the blower. Consequently, cooling from about 198° C. to about 153° C. takes place within a few seconds. In Section 2' cooling is effected by means of dry forced convection as in Curves A.

A comparison of the inventive process (Curve B) with the conventional cooling process (Curve A) reveals that the temperature gradient in the initial phase (1') of the process of the invention is about 6°/sec, while according to the conventional process the temperature gradient in the initial phase (1) is about 0.6°/sec. This means that the cooling rate is increased by the factor 10. The quality of the soldered joint is thus improved.

The process of the invention works in a vapour phase apparatus only within a limited region above the vapour phase, since only there sufficient molecules of the liquid are present in the ambient atmosphere and new molecules are entrained from the vapour phase due to suitable adjustment of the blower. When working in a higher region, a liquid has to be sprayed or be taken from the vapour phase.

A further embodiment of the invention is provided for the case that components are to be heat treated in the vapour phase at the bottom surface of a circuit board, e.g. when components are to be soldered out from the bottom surface and there is the risk that the components on the upper side of the module get undesirably warm. There are, e.g. housings which must not get warmer than 90° C. Up to now it was impossible to introduce modules into the vapour phase without the components becoming very hot at the upper surface, because e.g. the heat is transported upward e.g. through thermoconduction. The process of the invention permits that the lower surface of a module can take up heat in the vapour phase even for a longer period of time, while at the same time the upper surface of the module is cooled.

According to the invention, the module is moved for this purpose into the vapour phase, e. g. up to the upper edge of the circuit board and heated. The upper surface of the module is wetted by separated molecules from the vapour phase and cooled by forced convection by means of a gas stream. Overheating of the components can be avoided by using a smaller gas stream.

According to the process of the present invention the gas stream may be formed from ambient air or produced e.g. by an inert gas.

Furthermore, forced convection may also be effected by moving the soldered object. This could be effected e.g. by means of a swinging movement of the soldered objects above the vapour phase in ambient atmosphere. The soldered objects may be transported 4 to 6 cm above the vapor phase layer.

According to the invention the acceleration of evaporation can also be started by means of low pressure. This may take place in combination with the gas stream: Initially a gas stream deposits molecules onto the soldered objects, then the gas stream is turned off and low pressure is generated within the region of the soldered objects, so that the liquid is evaporated in an accelerated manner.

What is claimed is:

1. A process for cooling soldered objects in a vapour phase soldering apparatus, wherein a liquid is applied onto the soldered objects, and, for withdrawal of the evaporation heat, is evaporated by means of forced convection in an accelerated manner from the soldered objects directly after they have been removed from the vapour phase.

2. The process of claim 1, characterized in that forced convection is achieved by means of a gas stream.

3. The process of claim 1 characterized in that forced convection is effected by way of moving the soldered object.

4. The process according to claim 1 characterized in that the evaporation is accelerated by means of low pressure.

5. The process according to claim 2, characterized in that the gas stream is produced by a blower.

6. The process of claim 2, characterized in that the streaming gas is air or an inert gas.

7. The process according to claim 1 characterized in that the liquid is a vapour phase soldering liquid.

8. The process of claim 7, characterized in that the liquid is condensed from the vapour phase of the vapour phase soldering apparatus onto the soldered object.

9. The process according to claim 1 comprising the steps:

(a) Introducing the soldered object after soldering into a region above the vapour phase, and (b) generating a gas stream in a region above the vapour phase in a manner that the molecules from the vapour phase are transported by the gas stream.

10. The process of claim 9, characterized in that the soldered objects are transported 4 to 6 cm above the vapour phase layer.

11. The process of claim 9, characterized in that vapour phase soldering liquid is additionally sprayed onto the soldered objects.

12. The process according to claim 1, comprising the steps:

(a) Transporting the soldered objects to the vapour phase for soldering with the joints to be soldered, wherein the upper surface of the soldered object remains outside the vapour phase, and (b) generating a gas stream on the upper surface of the soldered object and the vapour phase.

13. The process according to claim 9, wherein the soldered objects are wetted, then the gas stream is turned off and low pressure is generated at the soldered objects.

* * * * *